(12) United States Patent
Lichtman

(10) Patent No.: US 8,045,258 B2
(45) Date of Patent: Oct. 25, 2011

(54) METHOD FOR REGULATING OSNR IN A FIBER OPTIC COMMUNICATION LINE USING RAMAN AMPLIFICATION

(75) Inventor: Eyal Lichtman, Ramat-Gan (IL)

(73) Assignee: ECI Telecom Ltd., Petach-Tikva (IL)

( * ) Notice: Subject to any disclaimer, the term of this patent is extended or adjusted under 35 U.S.C. 154(b) by 489 days.

(21) Appl. No.: 12/295,556

(22) PCT Filed: Mar. 8, 2007

(86) PCT No.: PCT/IL2007/000310
§ 371 (c)(1),
(2), (4) Date: Sep. 30, 2008

(87) PCT Pub. No.: WO2007/113792
PCT Pub. Date: Oct. 11, 2007

(65) Prior Publication Data
US 2009/0109523 A1 Apr. 30, 2009

(30) Foreign Application Priority Data

Mar. 30, 2006 (IL) .......................................... 174669

(51) Int. Cl.
*H04B 10/17* (2006.01)
*H04B 10/12* (2006.01)
*H01S 3/30* (2006.01)

(52) U.S. Cl. ...................................................... 359/334

(58) Field of Classification Search ................... 359/334
See application file for complete search history.

(56) References Cited

U.S. PATENT DOCUMENTS

2002/0080833 A1* 6/2002 Matsuura et al. ............... 372/20
2003/0053192 A1* 3/2003 Islam et al. .................... 359/327

FOREIGN PATENT DOCUMENTS

FR 2787953 A1 6/2000

OTHER PUBLICATIONS

Premaratne, "Analytical characterization of optical power and noise figure of forward pumped Raman amplifiers", Optics Express vol. 12, Iss. 18, pp. 4235-4245 (2004).*
V. E. Perlin et al., "Optimizing the Noise Performance of Broad-Band WDM Systems With Distributed Raman Amplification", IEEE Photonics and Technology Letters, vol. 14, No. 8, pp. 1199-1201, Aug. 2002.

(Continued)

*Primary Examiner* — Eric Bolda
(74) *Attorney, Agent, or Firm* — Browdy and Neimark, PLLC

(57) ABSTRACT

A method for selecting a relation between a gain Gf of a Forward Raman Amplifier (FRA) at a transmitting end of a fiber optic transmission line and an optical signal to noise ratio (OSNR) at a receiving end of the fiber optic transmission line satisfying limitations for real long transmission lines. The method comprises selecting the relation using a regulation function ROSNR obtained either in the form of a simplified equation, or in the form of one or more linear approximations of the function for practical ranges of the FRA gain.

11 Claims, 3 Drawing Sheets

OTHER PUBLICATIONS

R.-J. Essiambre et al., "Design of Bidirectionally Pumped Fiber Amplifiers Generating Double Rayleigh Backscattering", IEEE Photonics Technology Letters, vol. 14, No. 7, pp. 914-916, Jul. 2002.

Wang S, et al., "Distributed Fiber Raman Amplifiers: Analytical Expression of Noise Characteristics Under Complex Conditions", Oct. 2001, pp. 65-70, vol. 198, No. 1-3, North-Holland Publishing Co., Amsterdam, Netherlands.

Masuda H, et al., "Pump-Wavelength Detuning Method for Forward Pumped Distributed Raman Amplification Systems", May 2005, pp. 608-610, vol. 41, No. 10, ISSN: 0013-5194, Electronics Letters, IEE Stevenage, GB.

Huai Wei, et al., "Comparison of Different Raman Amplification Shcemes in Long-Span Fiber Transmission Systems With Double Rayleigh Backscattering", Dec. 2003, pp. 1782-1784, vol. 15, No. 12, ISSN: 1041-1135, IEEE Photonics Technology Letters, IEEE Service Center, Piscataway, NJ.

\* cited by examiner

METHOD FOR REGULATING OSNR IN A FIBER OPTIC COMMUNICATION LINE USING RAMAN AMPLIFICATION

FIELD OF THE INVENTION

The present invention relates to technologies of designing, installing and regulating optical networks comprising high power optical amplifiers, such as Raman amplifiers.

BACKGROUND OF THE INVENTION

There are a number of solutions proposed in the prior art for calculating and regulating Optical Signal to Noise Ratio (OSNR) in optical communication networks. In particular, there are a number of approaches for controlling and regulating OSNR in optical lines comprising Raman optical amplifiers.

FIG. 1 (prior art) shows a single span exemplary optical communication system 10. In practice, such systems may be composed of several spans.

Let the illustrated system 10 initially comprises a multiplexer assembly 12 at the transmitting end of the system, a demultiplexer assembly 14 at the receiving end of the system, an optical fiber link 15 extending between an optical amplifier (EDFA) 13 the transmitting end and EDFA 17 of the receiving end for conveying the multiplexed optical signal, and a backward Raman amplifier (BRA) 18 which is inserted close to the receiving end of the link. The goal of the system designer is that OSNR at the input of any single channel receiver at the receiving end of the link is larger than the receiver OSNR Tolerance, being the minimum OSNR for which the Bit Error Rate (BER) is still better than, say, a commonly accepted standard value $10^{-12}$. The required OSNR must be greater than the receiver OSNR tolerance+a margin selected by the system designer. One of the possibilities to improve the system OSNR is to increase the input power applied to the fiber up to the possible maximum, by using output power of the EDFA's 13 booster. The possible maximum is usually set by the system nonlinearity limit.

Those skilled in the art know that, at high power levels, nonlinear phenomena like self-phase modulation (SPM), Cross-phase modulation (XPM) and four-wave mixing (FWM) cause signal distortion and performance (or BER) degradation in the system.

The non-linearity limit of a system should be understood as follows. When a network works under the non-linearity limit, non-linear penalty (performance degradation due to non-linear effects in the fiber) does not exceed a value determined by a system designer (say, 1 or 2 dB). Actually, crossing of the non-linearity limit can be expressed as such a condition of the system when increasing the power applied to the fiber leads to increase of a real OSNR required for the same stated BER. Usually, when performance of an optical line cannot be further improved by its own resources and without crossing the non-linearity limit, network designers insert a Forward Raman Amplifier (FRA) in the line.

FIG. 1 therefore illustrates inserting a FRA 16 (shown as a dashed arrow) at the beginning of the link 15.

A number of articles, for example 1) Essiambre et al. IEEE photon. Techn. Lett. Vol. 14, pp. 914 (2002); 2) Perline and Winful. IEEE photon. Techn. Lett. Vol. 14, pp. 1199 (2002) explain that the Forward Raman amplification (FRA) enables the system designer to increase the effective input power applied to the fiber, thus improving the system OSNR, without crossing the nonlinear limit.

The above articles propose various but quite complex mathematical equations which enable theoretically calculating the FRA power required for a specific communication system. However, these and some other previous works dealt with too general systems; it is very hard to employ their methods of calculation, including many system parameters, to practical systems.

To the best of the Applicant's knowledge, prior art does not give a simple and effective advice of how to estimate the required gain of FRA for obtaining a designed value of OSNR in real optical telecommunication systems. Likewise, no recommendations are found for effective OSNR regulation in real systems.

OBJECT OF THE INVENTION

It is therefore the object of the present invention to present a simple tool to the system designer, enabling to effectively deploy FRA in an optical communication line and perform adjustment of OSNR at the receiving end of the line.

SUMMARY OF THE INVENTION

The problem of obtaining desired values of OSNR when designing an optical line consists of at least three sub-problems:

a) selecting a proper Raman amplifier for an optical line, when required;
b) adjusting OSNR at the receiving end of the line so as not to become lower than the receiver tolerance; and
c) adjusting OSNR at the receiving end for various optical channels transmitted via the line.

The Inventor has derived a formula for any real long transmission system operating substantially close to its non-linearity limit, that shows that the gain of a required Forward Raman Amplifier (FRA) can be determined, with quite a high accuracy, solely by the desired value of OSNR improvement, and that an almost linear regulation function can be obtained for fine tuning of the OSNR by regulating the FRA gain.

In practice, the Inventor has found that any reasonable OSNR improvement (say, up to 5 dB) can be achieved by a properly selected value of the FRA gain.

The Inventor has also found that, when adding and regulating a FRA in a long transmission system that operates substantially close to its non-linearity limit, a desired OSNR increment practically does not depend on gain of a Backward Raman Amplifier BRA (if comprised in the system) and on many other parameters usually present in theoretical equations described in the prior art references.

The long transmission systems should be understood as such optical communication systems where a value of the power loss L in a fiber span that extends between two optical network nodes respectively associated with its transmitting end and its receiving end, is much greater than a value of the working gain $G_f$ of the FRA (Forward Raman Amplifier) associated with the transmitting end:

$$L \gg G_f$$

If a BRA (Backward Raman Amplifier) is already present in the same system (span) at its receiving end, the above condition should be understood as $$L \gg \text{Max of } (G_f, G_b),$$

where $G_f$ is a value of working gain of the FRA,
$G_b$ is a value of working gain of the BRA if present,
L—is power loss in the fiber span, being a passive fiber characteristic that depends only on the fiber length and quality.

Preferably, the value of power loss L is at least one order of magnitude higher (approximately by 10 dB) than the value of gain $G_f$ which is also called "on-off gain" (or of gain $G_b$, if BRA is present).

The gain of BRA is usually of the same order of magnitude as that of the FRA. However, even in a rear case when Gb>>Gf, the condition of long transmission systems still remains the same and can be just rewritten as L>>Gb.

For example, the formula found out by the Inventor applies to an optical span equipped with a FRA having gain $G_f$=10 dB, wherein the power loss L of an optical span is approximately 20 dB or more.

In the present description, the term "gain" will be used intermittently with the term "on-off gain" accepted in the art.

In particular, under a set of assumptions that the Inventor considers practically correct for realistic long transmission systems working close to their non-linearity limit, the Inventor shows that, by introducing a FRA at the transmitting end of a fiber span, OSNR of an optical signal at the receiving end can be improved according to a function of OSNR improvement $R_{OSNR}$, being close to linear (or at least, approximatable to linear portions):

$$R_{OSNR}=G_f/R_{NL} \quad (1)$$

where $G_f$ is the FRA on-off gain and $R_{NL}$ is the FRA's so-called nonlinear enhancement factor determined close to the following:

$$R_{NL}=\mu G_f(\ln(G_f))^{-\mu}[\Gamma(\mu)-\Gamma(\mu,\ln(G_f))] \quad (2)$$

where $\mu=\alpha/\beta$, $\alpha$ is the fiber attenuation at the signal wavelength (practically, the average fiber attenuation at the C-band), known for each specific fiber, $\beta$ is the fiber attenuation of the Raman pump wavelengths (in practice, the average value over the pump wavelengths), and $\Gamma(x)$ and $\Gamma(x, y)$ are the Gamma and the incomplete Gamma functions, respectively.

It should be noted that though the coefficients $\alpha$ and $\beta$ may slightly vary from fiber to fiber, their ratio $\mu=\alpha/\beta$ remains almost constant. The remaining components of the expression (2) can easily be obtained by those skilled in the art.

Since a modern FRA comprises two Raman pumps, the simultaneous operation of the pumps enables obtaining equal Raman gain for each of the propagating signal wavelengths. Thereby, one and the same equation (2) is practically applicable to each optical channel of a multi-channel signal.

Further, the Inventor has shown that for a practical interval of 0-20 dB of the FRA on-off gain, the function of OSNR improvement $R_{OSNR}$ at the receiver end of the optical transmission line can be approximated as a number of linear sections:

$$R_{OSNR}=0.39G_f \text{ for } 0 \text{ dB}<G_f \leq 6 \text{ dB} \quad (3)$$

$$R_{OSNR}=0.27G_f+0.7 \text{ for } 6 \text{ dB}<G_f \leq 13 \text{ dB} \quad (4)$$

$$R_{OSNR}=0.2G_f+1.55 \text{ for } 13 \text{ dB}<G_f \leq 20 \text{ dB} \quad (5)$$

optionally, for an interval of 0-12 dB, the function can be approximated as:

$$R_{OSNR}=0.35G_f \text{ for } 0 \text{ dB}<G_f \leq 12 \text{ dB} \quad (6)$$

Suitable calculations and verifying experiments were performed and have proven the proposed method.

In simple words, when designing a transmission line, the Inventor proposes selecting, for a long fiber optic transmission line, a FRA capable of reaching a certain "on-off" gain calculated according to Equation (1) in order to improve OSNR of the line by a certain required amount.

According to that version, the Inventor proposes a method of selecting a Forward Raman Amplifier (FRA) to be inserted at a transmitting end of a given fiber optic transmission line, for providing improvement of OSNR at a receiving end of said transmission line by no less than a certain required improvement amount $R_{OSNR}$, the method comprises determining a required value of (working) gain $G_f$ of said FRA by using a regulation function ($R_{OSNR}$) of OSNR improvement substantially close to that defined by the following expression:

$$R_{OSNR}=G_f/R_{NL} \quad (1)$$

where $R_{NL}$ is the FRA nonlinear enhancement factor:

$$R_{NL}=\mu G_f(\ln(G_f))^{-\mu}[\Gamma(\mu)-\Gamma(\mu,\ln(G_f))] \quad (2)$$

where $\mu=\alpha/\beta$, $\alpha$ is the fiber attenuation at the signal wavelength, $\beta$ is the fiber attenuation of the Raman pump wavelengths, $\Gamma(x)$ and $\Gamma(x, y)$ are the Gamma and the incomplete Gamma functions, respectively;

the method being applicable if the following two conditions are satisfied:

the given fiber optic transmission line operates under a non-linearity limit, power loss L of the given fiber optic transmission line is much greater than the determined gain $G_f$.

The FRA capable of reaching a value of gain not less than the required gain $G_f$, can be considered as selected.

The method may further comprise inserting the selected FRA (i.e. the FRA capable of reaching a value of gain not less than $G_f$) in the fiber optic transmission line at the transmitting end.

Further, the Inventor proposes adding a step of regulating (adjusting, fine tuning) of the OSNR at the receiving end of the transmission line by adjusting gain of said FRA according to the regulation function expressed by said equation (1).

Since any Raman amplifier comprises pumps, the gain adjustment can be performed by controlling pumps of said FRA.

The Inventor also proposes an alternative method for regulating OSNR in a real, given fiber optic transmission line comprising an existing FRA at its transmitting end; the method comprises regulating OSNR at the receiving end of said transmission line by adjusting gain of said FRA using a regulation function substantially expressed by the equation (1), provided that the given transmission line operates without crossing the non-linearity limit, and that L>>$G_f$, wherein:

$G_f$ is a value of working (or actual) gain of the existing FRA,

L is a value of power loss in the given fiber transmission line.

For both of the methods proposed above, the power loss L should be approximately one order of magnitude greater than the determined gain $G_f$.

In case the given transmission line initially comprises a Backward Raman Amplifier BRA, the transmission line should satisfy a condition that the power loss L is much greater (for example, approximately one order of magnitude greater) than the highest value among values of the $G_f$ and $G_b$, wherein $G_b$ is a value of working (or actual) gain of the BRA.

The step of regulating OSNR actually comprises adjusting gain of said FRA by an amount produced by said regulation function for a value of a certain required improvement of OSNR.

Both the method of selecting a FRA, and the method of regulating OSNR in the line comprising a FRA can be essentially simplified by using a linear approximation of the regulation function (1).

It should be noted that the regulation function can be presented as a sum of linear approximations according to equations 3, 4, 5.

The methods can therefore be simplified by using a specific linear section of the regulation function for practically required intervals of FRA gains and OSNR increments.

Yet further, for a multi-channel optical traffic conveyed via said transmission line, the Inventor proposes regulating the OSNR so as to achieve said certain required improvement of OSNR in "the worst" optical channel, wherein the worst optical channel is considered to be such having the lowest OSNR at a currently used value of the FRA gain $G_f$.

In one specific embodiment, the optical fiber transmission line comprises a single optical fiber span extending between the transmitting end and the receiving end of the line.

It should be added that the method can be applied to an optical system in the form of the fiber optic transmission line comprising a number of optical spans, each of the spans working close to the limit of non-linearity and being equipped with a FRA such that values of $G_f$ of all said FRA are substantially equal to one another; and wherein each of the spans satisfies either the requirement $L>>G_f$, or $L>>\text{Max of }(G_f, G_b)$ in case any of the optical spans is also equipped with a BRA. The OSNR of that system can be then regulated according to the equation 1, equation 6, and/or the equations 3, 4, 5, by synchronously regulating the FRA gains $G_f$ of each of the spans.

Generally speaking, the Inventor has found a method for selecting a relation between a gain $G_f$ of a Forward Raman Amplifier (FRA) at a transmitting end of a fiber optic transmission line and an optical signal to noise ratio (OSNR) at a receiving end of the fiber optic transmission line satisfying the above-mentioned limitations for long lines; wherein the method comprises selecting said relation using a regulation function $R_{OSNR}$ either in the form of equation (1), or in the form of one or more linear approximations for a practical range of the FRA gain 0 to 12 dB or 0 to 20 dB.

For example, the regulation function can be in the form of one or more, or a sum of the following linear approximations:

$$R_{OSNR}=0.39G_f \text{ for } 0\text{ dB}<G_f\leq 6\text{ dB} \quad (3)$$

$$R_{OSNR}=0.27G_f+0.7 \text{ for } 6\text{ dB}<G_f\leq 13\text{ dB} \quad (4)$$

$$R_{OSNR}=0.2G_f+1.55 \text{ for } 13\text{ dB}<G_f\leq 20\text{ dB} \quad (5)$$

In a more approximate case, the regulation function can be in the form of a single linear approximation section covering a more limited practical range of the FRA gain:

$$R_{OSNR}=0.35G_f \text{ } 0\text{ dB}<G_f\leq 12\text{ dB} \quad (6)$$

The general method can be applied a) for regulating OSNR at the receiving end of a given transmission line by adjusting gain of the FRA existing at the transmitting end of the line; b) for selecting a Forward Raman Amplifier (FRA) to be inserted at a transmitting end of a fiber optic transmission line, for providing a required OSNR or OSNR improvement at a receiving end of said transmission line.

The dependence uncovered and checked by the Inventor has allowed providing a surprisingly simple handy tool that helps the network designer to determine the FRA on-off gain to be ensured in order to achieve a required OSNR or a required improvement of the system OSNR.

BRIEF DESCRIPTION OF THE DRAWINGS

The invention will further be described in more detail with reference to the following non-limiting drawings, in which.

DETAILED DESCRIPTION OF THE PREFERRED EMBODIMENTS

Figure 1:
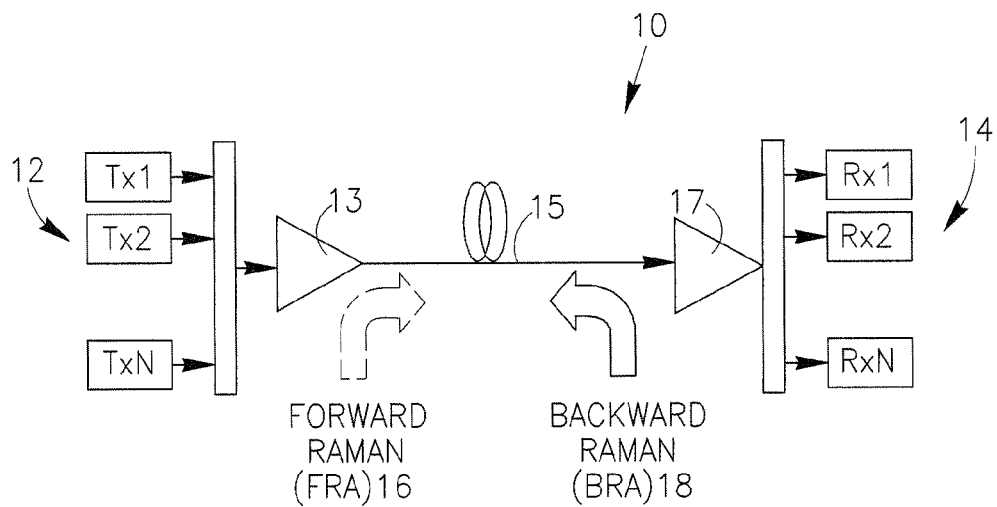
FIG. 1 is a simplified block diagram of a multi channel communication system comprising a long transmission line equipped with BRA and FRA.

FIG. 1 is referred to in the Background description.

Figure 2:
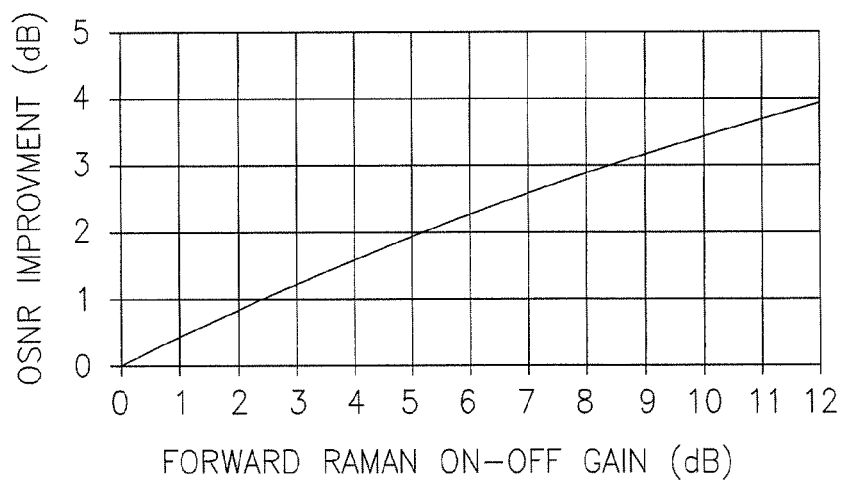
FIG. 2 is a graphical representation of a regulation function proposed by the Inventor for long fiber optic transmission lines, within the most widely used intervals of FRA gains and OSNR changes.

FIG. 2 graphically presents the regulation function proposed by the Inventor for determining the minimal on-off gain of a FRA, if associated with a transmitting end of a long fiber optic transmission line required to achieve a certain OSNR improvement at the receiving end of the optical fiber span.

An exemplary long fiber optic transmission line is shown in FIG. 1 as a single span (15).

Let us consider for our example, that the line satisfies the following two conditions: it operates under a non-linearity limit (without any non-linearity effects), and its fiber loss L is much greater than the maximal gain Gm of the FRA (16). If, for example the Gm of the existing FRA is 10 dB, the method can be applied quite accurate when the line is long enough to create fiber loss of about 20 dB or more. And vice versa, if quite a long given transmission line is not yet provided with Raman amplifiers and requires specific OSNR improvement, the proposed method enables performing a quick estimation of the required FRA gain.

The regulation function is built according to Equation (1) for the most practical interval of the FRA gains, namely from 0 to 12 dB.

The graphical diagram enables to obtain a practical answer to a question—which FRA gain should be selected (achieved) for obtaining a specific required improvement in OSNR at the receiving end of the long transmission line.

It should be noted that the transmission line of interest may comprise a number of fiber spans similar to span 15, each comprising a FRA and a BRA having substantially equal gains and satisfying both of the above conditions. In this case, OSNR at the receiving end of the line can be regulated using the same regulation function, by adjusting gain of the FRA in each of the spans synchronously.

Figure 3:
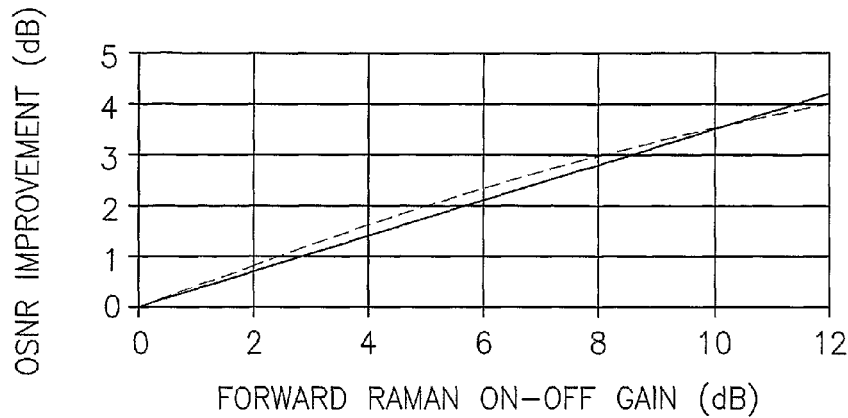
FIG. 3 illustrates a linear approximation of the function illustrated in FIG. 2.

FIG. 3 illustrates that, for the sake of simplicity and practical applicability, the regulation function (1) can be approximated with quite a good accuracy, so that a required OSNR improvement becomes a linear function of the FRA on-off gain.

In particular, for the practical region of 0-12 dB FRA on-off gain, the OSNR improvement function for a long fiber optic transmission line may be linearized by the following equation:

$$R_{OSNR}=0.35G_f \quad (6)$$

FIG. 3 presents both the accurate (dashed line) and the approximated (solid line) functions between the OSNR improvement and the FRA on-off gain.

Figure 4:
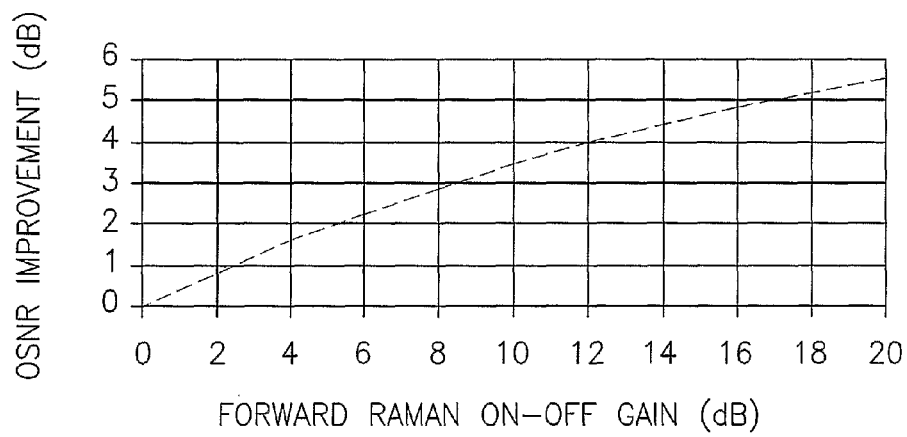
FIG. 4 illustrates a graphical representation of the regulation function over a wider range of FRA gain, than that of FIG. 1.

FIG. 4 illustrates the regulation function built, for a long optical fiber transmission line, on a wider range of the FRA gain Gf (between 0 to 20 dB). In order to utilize such a function in practice with reasonable accuracy, it is useful to divide the function into a number of smaller sections and to linearize these sections separately.

Figure 5:
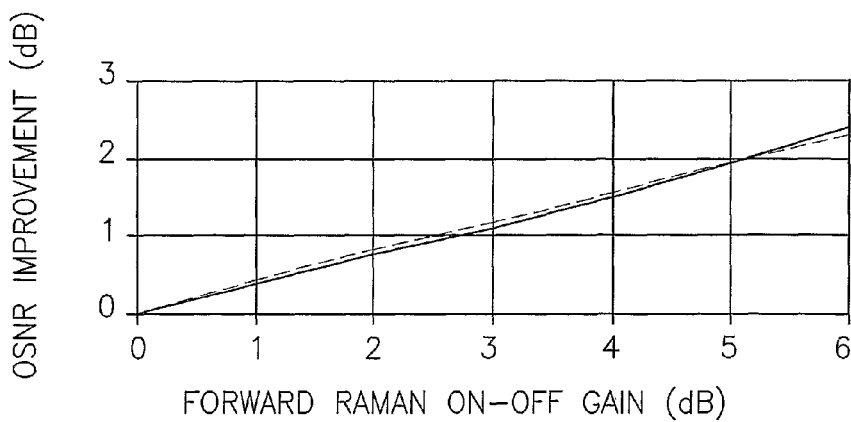
FIGS. 5, 6 and 7 illustrate different sections of the regulation function presented in FIG. 4, with partial linear approximations of the function at different intervals of the FRA gain.

FIG. 5 illustrates a partial linear approximation of the function shown in FIG. 4 for the range of FRA gain Gf from 0 to 6 dB. The function is approximated as follows:

$$R_{OSNR}=0.39G_f \text{ for } 0 \text{ Db} < G_f \leq 6 \text{ dB} \quad (3)$$

Figure 6:
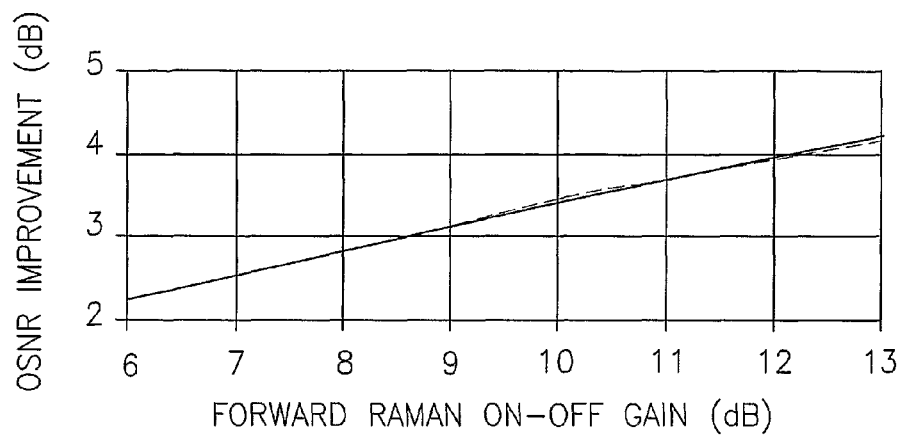

FIG. 6 illustrates a partial linear approximation of the function shown in FIG. 4 for the range of FRA gain Gf from 6 to 13 dB. The function is approximated as follows:

$$R_{OSNR}=0.27G_f+0.7 \text{ for } 6 \text{ dB} < G_f \leq 13 \text{ dB} \quad (4)$$

Figure 7:
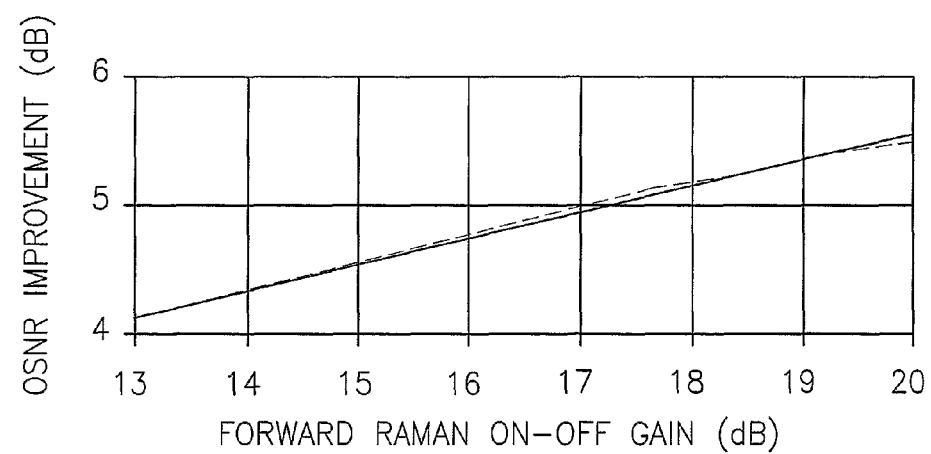

FIG. 7 illustrates a partial linear approximation of the function shown in FIG. 4 for the range of FRA gain Gf from 13 to 20 dB. The function is approximated as follows:

$$R_{OSNR}=0.2G_f+1.55 \text{ for } 13 \text{ dB} < G_f \leq 20 \text{ dB} \quad (5)$$

The approximated regulation functions shown in FIGS. 3, 5, 6, and 7 can be used by a network designer for practical estimation of the FRA gain Gf required for obtaining a specific improvement of the OSNR at the receiving end of the line, and for further adjustment of the gain—each in a specific interval of gain values.

In these figures, the regulation function is shown by the dashed line, and the approximated linearized functions—by the solid line.

It should be appreciated that the equations (1) and (2) describing the regulation function can be slightly altered, without changing the principle of the present invention, such modified equations (regulation functions) should thereby be considered part of the invention.

The invention claimed is:

1. A method for selecting a relation between a gain $G_f$ of a Forward Raman Amplifier (FRA) at a transmitting end of a fiber optic transmission line and an optical signal to noise ratio (OSNR) at a receiving end of the fiber optic transmission line, provided that said transmission line operates under a non-linearity limit, and power loss L of the fiber optic transmission line is much greater than a selected value of the gain $G_f$; the method comprises selecting said relation by using a regulation function $R_{OSNR}$ of OSNR improvement, defined substantially close to the following expression:

$$R_{OSNR}=G_f/R_{NL} \quad (1)$$

where $R_{NL}$ is a factor of the FRA, calculated substantially close to the following:

$$R_{NL}=\mu G_f(\ln(G_f))^{-\mu}[\Gamma(\mu)-\Gamma(\mu,\ln(G_f))] \quad (2)$$

where $\mu=\alpha/\beta$,

α is the fiber attenuation at the signal wavelength,
β is the fiber attenuation of the Raman pump wavelengths,
$\Gamma(x)$ and $\Gamma(x, y)$ are the Gamma and the incomplete Gamma functions, respectively.

2. A method for selecting a relation between a gain $G_f$ of a Forward Raman Amplifier (FRA) at a transmitting end of a fiber optic transmission line and an optical signal to noise ratio (OSNR) at a receiving end of the fiber optic transmission line, provided that said transmission line operates under a non-linearity limit, and power loss L of the fiber optic transmission line is much greater than a selected value of the gain $G_f$; the method comprises selecting said relation using a regulation function $R_{OSNR}$ in the form of one or more of the following approximated linear sections covering a practical range of the FRA gain 0 to 20 dB:

$$R_{OSNR}=0.39G_f \text{ for } 0 \text{ dB} < G_f \leq 6 \text{ dB} \quad (3)$$

$$R_{OSNR}=0.27G_f+0.7 \text{ for } 6 \text{ dB} < G_f \leq 13 \text{ dB} \quad (4)$$

$$R_{OSNR}=0.2G_f+1.55 \text{ for } 13 \text{ dB} < G_f \leq 20 \text{ dB} \quad (5)$$

3. A method for selecting a relation between a gain $G_f$ of a Forward Raman Amplifier (FRA) at a transmitting end of a fiber optic transmission line and an optical signal to noise ratio (OSNR) at a receiving end of the fiber optic transmission line, provided that said transmission line operates under a non-linearity limit, and power loss L of the fiber optic transmission line is much greater than a selected value of the gain $G_f$; the method comprises selecting said relation using a regulation function $R_{OSNR}$ in the form of an approximated linear section covering a practical range of the FRA gain 0 to 12 dB:

$$R_{OSNR}=0.35G_f \, 0 \text{ dB} < G_f \leq 12 \text{ dB} \quad (6)$$

4. The method according to claim 1, for selecting said Forward Raman Amplifier (FRA) to be inserted at the transmitting end of a given said fiber optic transmission line, for providing improvement of OSNR at the receiving end of said transmission line by no less than a certain required amount $R_{OSNR}$, the method comprises determining a required value of gain $G_f$ of said FRA by using said regulation function $R_{OSNR}$.

5. The method according to claim 4, further comprising a step of inserting, in the fiber optic transmission line, the FRA capable of reaching a value of gain not less than $G_f$ and further comprising a step of regulating OSNR at the receiving end of the transmission line by adjusting gain of said FRA.

6. The method according to claim 1, for regulating OSNR in a given said fiber optic transmission line comprising an existing said FRA at its transmitting end, provided that the given transmission line operates under a non-linearity limit, and that $L \gg G_f$, wherein:

$G_f$ is a value of working gain of the existing FRA, L is a value of power loss in the given fiber transmission line; the method comprises regulating OSNR at the receiving end of said transmission line by adjusting gain of said FRA using said regulation function $R_{OSNR}$.

7. The method according to claim 1, wherein the transmission line initially comprises a Backward Raman Amplifier BRA and satisfies a condition that the power loss L is much greater than the highest value among values of $G_f$ and $G_b$, wherein $G_b$ is a value of working gain of the BRA.

8. A method according to claim 1, wherein said regulation function is used in the form of its linear approximation.

9. The method according to claim 8, wherein the regulation function is utilized in the form of one or more of the following linear approximations for a practical range of the FRA gain 0 to 20 dB:

$$R_{OSNR}=0.39G_f \text{ for } 0 \text{ dB} < G_f \leq 6 \text{ dB} \quad (3)$$

$$R_{OSNR}=0.27G_f+0.7 \text{ for } 6 \text{ dB} < G_f \leq 13 \text{ dB} \quad (4)$$

$$R_{OSNR}=0.2G_f+1.55 \text{ for } 13 \text{ dB} < G_f \leq 20 \text{ dB} \quad (5)$$

10. The method according to claim 9, wherein the regulation function is utilized in the form of the following linear approximation for a practical range of the FRA gain 0 to 12 dB:

$$R_{OSNR}=0.35G_f \text{ 0 dB}<G_f \leq 12 \text{ dB} \quad (6)$$

11. The method according to claim 6, wherein the optical fiber transmission line comprises one or more optical spans extending between the transmitting end and the receiving end of the line, each of said spans working close to the limit of non-linearity and being equipped with a FRA such that values of $G_f$ of all said FRA are substantially equal to one another; and wherein each of the spans satisfies either the requirement $L \gg G_f$ or $L \gg \text{Max of }(G_f, G_b)$ in case any of the optical spans is also equipped with a BRA; the method comprises regulating OSNR of the line by synchronously regulating $G_f$ of each of the spans according to the equation (1) and/or the following linear approximations of the regulation function for a practical range of the FRA gain 0 to 20 dB:

$$R_{OSNR}=0.39G_f \text{ for 0 dB}<G_f \leq 6 \text{ dB} \quad (3)$$

$$R_{OSNR}=0.27G_f+0.7 \text{ for 6 dB}<G_f \leq 13 \text{ dB} \quad (4)$$

$$R_{OSNR}=0.2G_f+1.55 \text{ for 13 dB}<G_f \leq 20 \text{ dB} \quad (5)$$

$$R_{OSNR}=0.35G_f \text{ for 0 dB}<G_f \leq 12 \text{ dB} \quad (6)$$

* * * * *